US012576514B2

(12) United States Patent
Li

(10) Patent No.: US 12,576,514 B2
(45) Date of Patent: Mar. 17, 2026

(54) ROBOT CONTROL METHOD, ROBOT, AND CONTROL TERMINAL

(71) Applicant: Shenzhen Pengxing Intelligent Research Co., Ltd., Shenzhen (CN)

(72) Inventor: Zhen Li, Shenzhen (CN)

(73) Assignee: Shenzhen Pengxing Intelligent Research Co., Ltd., Shenzhen (CN)

( * ) Notice: Subject to any disclaimer, the term of this patent is extended or adjusted under 35 U.S.C. 154(b) by 184 days.

(21) Appl. No.: 18/385,478

(22) Filed: Oct. 31, 2023

(65) Prior Publication Data

US 2024/0149439 A1     May 9, 2024

(30) Foreign Application Priority Data

Nov. 9, 2022     (CN) .......................... 202211400794.1

(51) Int. Cl.
*B25J 9/16* (2006.01)

(52) U.S. Cl.
CPC .................................... *B25J 9/1602* (2013.01)

(58) Field of Classification Search
None
See application file for complete search history.

(56) References Cited

U.S. PATENT DOCUMENTS

| | | | | |
|---|---|---|---|---|
| 11,353,887 | B2 * | 6/2022 | Xiong | .................... B25J 9/1653 |
| 2011/0301756 | A1 * | 12/2011 | Yoshiike | .............. B62D 57/032 |
| | | | | 901/1 |
| 2021/0114206 | A1 * | 4/2021 | Haley | .................... B25J 9/1605 |
| 2022/0402131 | A1 * | 12/2022 | Sivanath | ................ B25J 9/1692 |

FOREIGN PATENT DOCUMENTS

CN            112809667            5/2021

* cited by examiner

*Primary Examiner* — Arslan Azhar
(74) *Attorney, Agent, or Firm* — ScienBiziP, P.C.

(57) ABSTRACT

The present application discloses a robot control method, a robot and a control terminal, which relate to the field of robot technology and can be used to improve the stability of the robot when there is a deviation between a desired posture and an actual posture of the robot. The robot control method includes calculating a first deviation between a current posture and the desired posture of the robot; updating dynamic parameters of the robot according to the first deviation; and obtaining a driving instruction of at least one joint module according to selected dynamic parameters to control the posture of the robot reaches or is close to the desired posture.

15 Claims, 8 Drawing Sheets

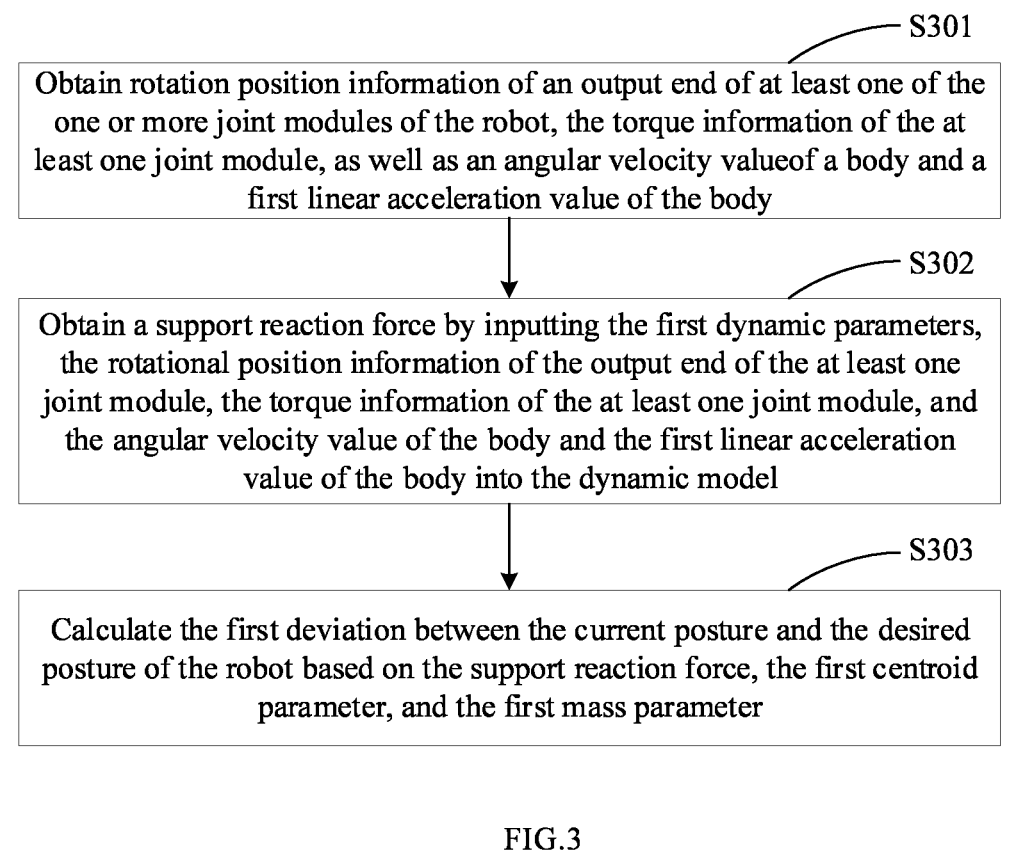

S301

Obtain rotation position information of an output end of at least one of the one or more joint modules of the robot, the torque information of the at least one joint module, as well as an angular velocity valueof a body and a first linear acceleration value of the body

S302

Obtain a support reaction force by inputting the first dynamic parameters, the rotational position information of the output end of the at least one joint module, the torque information of the at least one joint module, and the angular velocity value of the body and the first linear acceleration value of the body into the dynamic model

S303

Calculate the first deviation between the current posture and the desired posture of the robot based on the support reaction force, the first centroid parameter, and the first mass parameter

FIG.3

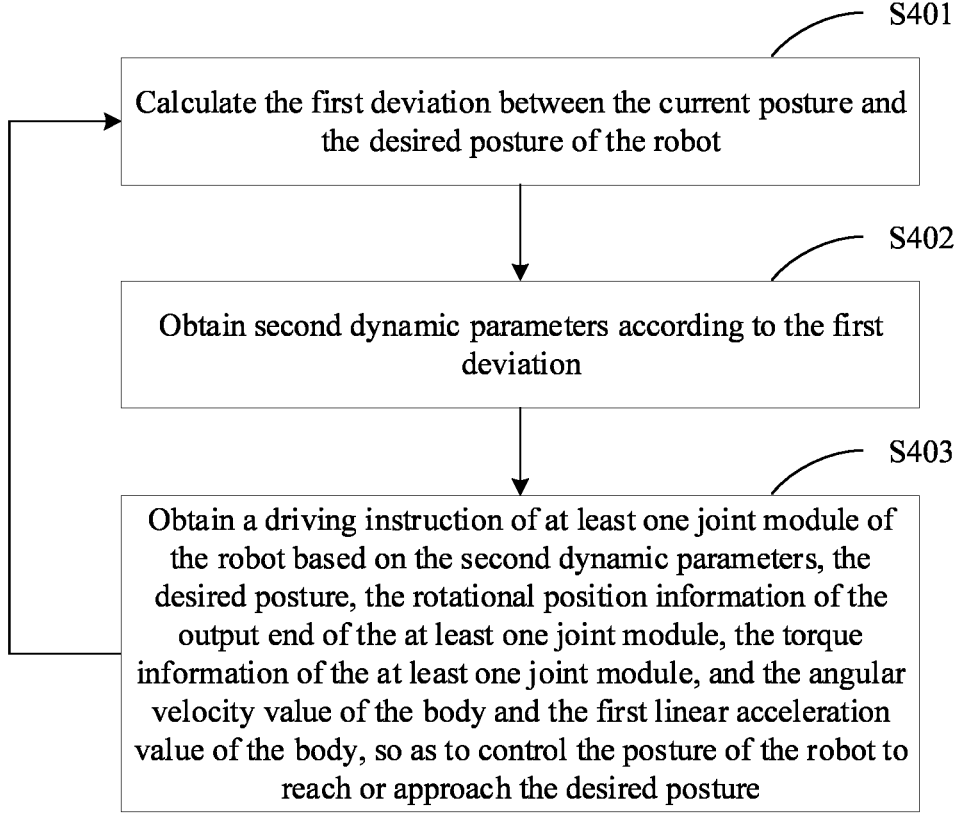

S401

Calculate the first deviation between the current posture and the desired posture of the robot

S402

Obtain second dynamic parameters according to the first deviation

S403

Obtain a driving instruction of at least one joint module of the robot based on the second dynamic parameters, the desired posture, the rotational position information of the output end of the at least one joint module, the torque information of the at least one joint module, and the angular velocity value of the body and the first linear acceleration value of the body, so as to control the posture of the robot to reach or approach the desired posture

FIG.4

ROBOT CONTROL METHOD, ROBOT, AND CONTROL TERMINAL

FIELD

This application relates to the field of robot technology, and in particular to a robot control method, a robot, and a control terminal.

BACKGROUND

Control strategies based on dynamic models are widely used in various types of robots, such as quadruped robots that need to perform various bionic actions quickly, accurately, and flexibly. Traditional control strategies have high requirements for the accuracy of the dynamic parameters input to the dynamic model. When the accuracy of the dynamic parameters does not meet expectations, the actual posture of the robot deviates from the desired posture, causing it difficult for the robot to reach or approach the desired posture, resulting in reduced stability of the robot.

BRIEF DESCRIPTION OF THE DRAWINGS

FIG. 3 is a flow chart of sub-blocks of block S201 shown in FIG. 2 provided by an embodiment of the present application.

FIG. 4 is a flow chart of a robot control method provided by another embodiment of the present application.

DETAILED DESCRIPTION

Figure 1:
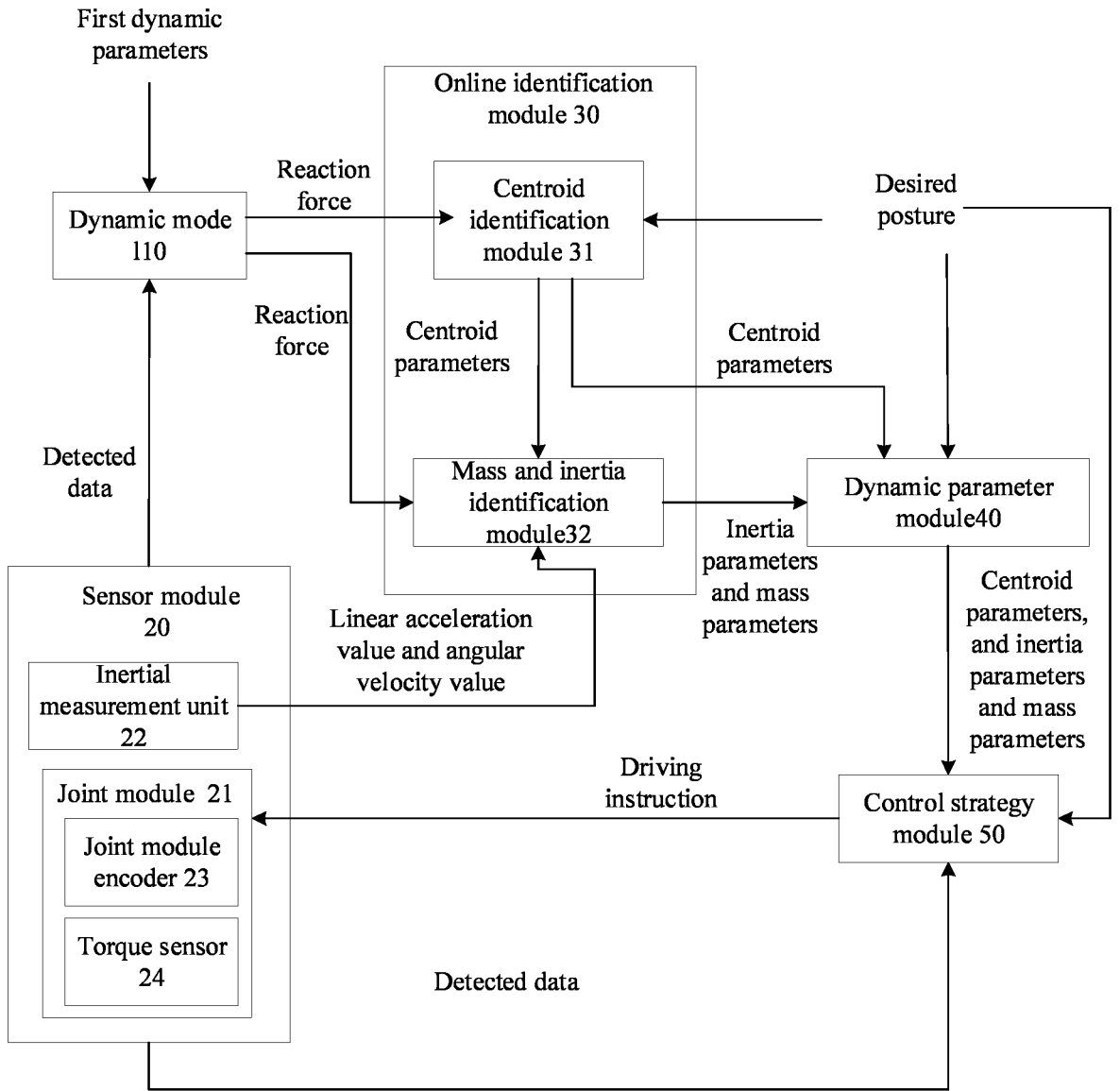
FIG. 1 is a schematic diagram of a logical architecture of a robot control method provided by an embodiment of the present application.

It should be noted that in the embodiments of this application, "at least one" refers to one or more, and "multiple" refers to two or more than two. "And/or" describes the association of associated objects, indicating that there can be three relationships. For example, A and/or B can mean: A exists alone, A and B exist simultaneously, and B exists alone, where A and B can be singular or plural. The terms "first", "second", "third", "fourth", etc. (if present) in the description, claims and drawings of this application are used to distinguish similar objects, rather than to describe a specific order or sequence.

In addition, it should be noted that the method disclosed in the embodiment of the present application or the method shown in the flow chart includes one or more blocks for implementing the method. Without departing from the scope of the claims, the order of executing multiple blocks can be interchanged with each other and some of the blocks can also be deleted.

A traditional control strategy inputs preset dynamic parameters into a dynamic model, and then controls a robot based on an output of the dynamic model. The preset dynamic parameters are used to characterize the dynamic characteristics of the robot. The preset dynamic parameters can be simulation values obtained through simulation processing with computer aided design (CAD) software, or can be theoretical values or priori values obtained through theoretical calculations.

When the robot is subjected to an external force, or a load is increased or reduced, a current posture of the robot may deviate from a desired posture. Using traditional control strategies, when the current posture of the robot deviates from the desired posture, since the dynamic parameters are constant, it is difficult for the robot to reach or approach the desired posture, resulting in a reduction in the stability of the robot.

For example, when a robot uses a mechanical arm to grab an express package, as the robot's load increases, the robot's mechanical arm is subject to a gravity of the express package, causing the posture of the robot to deviate from a desired posture, and a posture of an entire body undergoes a sudden change, such as the entire body tilts severely, or the robot even rolls over, thus affecting the stability of the robot.

For another example, a tool is installed on an end effector of a mechanical arm of the robot. When the tool is removed, as the load on the robot decreases, the end effector of the mechanical arm no longer receives the gravity of the tool, causing a posture of the robot deviating from the desired posture, the posture of the entire body mutates, thus affecting the stability of the robot.

For another example, when the mechanical arm of the robot is dragged under tension, the mechanical arm deviates from the desired posture as the posture caused by the tension, the posture of the entire body changes suddenly, making it difficult for the robot to maintain the status before the mechanical arm is dragged, thus affecting the stability of the robot.

Based on this, this application provides a robot control method, a robot, and a control terminal. The robot calculates a first deviation between a current posture and a desired posture, updates dynamic parameters of the robot according to the first deviation, obtains a driving instruction of at least one joint module according to selected dynamic parameters, to control a posture of the robot to reach or be close to the desired posture. It can adaptively adjust the dynamic parameters and control the posture to reach or be close to the desired posture, thereby improving the stability of the robot.

The robot control method provided by this application is described below.

FIG. 1 is a schematic diagram of a logical architecture of the robot control method provided by an embodiment of the present application.

Referring to FIG. 1, the robot inputs first dynamic parameters and data detected by a sensor module 20 into a dynamic model 10. The first dynamic parameters may include one or more initial values or one or more updated values obtained by executing the robot control method of this embodiment. Each of the one or more initial values can be a simulated value obtained by simulating using a software of a computer aided design (CAD), or can be a theoretical value or a priori value obtained by theoretical calculation. The data detected by the sensor module 20 may include torque information of a joint module 21 detected by a joint module 21, acceleration information and angular velocity information of a body detected by an inertial measurement unit (IMU) 22, and rotational position information of an output end of the joint module 21 detected by a joint module encoder 23. It should be noted that the output end is part of the joint module 21 and is not illustrated in FIG. 1.

It can be understood that in some embodiments, the robot may include a body, a head, a mechanical arm, one or more legs, and one or more foot ends.

The joint module 21 may include the joint module encoder 23 and a torque sensor 24. The joint module 21 can detect the torque information of the joint module using the torque sensor 24, and detect the rotational position information of the output end of the joint module through the joint module encoder 23.

Next, the robot inputs a reaction force output by the dynamic model 10, the data detected by the sensor module 20, and a desired posture into an online identification module 30. The data detected by the sensor module 20 may include an acceleration value and a speed value detected by the inertial measurement unit 22. The online identification module 30 includes a centroid identification module 31 and a mass and inertia identification module 32.

It can be understood that the posture of the robot may include at least one of the following: a position, a linear velocity, a linear acceleration, an attitude, an angular velocity, an angular momentum, and an angular acceleration of the robot.

The robot inputs the reaction force output by the dynamic model 10 and the desired posture into the centroid identification module 31. The centroid identification module 31 can calculate the first deviation between the current posture of the robot and the desired posture, and can update centroid parameters through a least squares method.

The robot inputs the reaction force output by the dynamic model 10, the acceleration value and the speed value of the body detected by the inertial measurement unit 22, and the centroid parameters output by the centroid identification module 31 into the mass and inertia identification module 32. The mass and inertia identification module 32 can estimate inertia parameters and mass parameters through a strong tracking extended Kalman filter method to eliminate measurement noise and process noise, and improve an accuracy of an estimation result when the posture of the robot changes.

Then, the robot inputs the centroid parameters output by the centroid identification module 31 and the inertia parameters and the mass parameters output by the mass and inertia identification module 32 into the dynamic parameter module 40.

Next, the robot inputs dynamic parameters output by the dynamic parameter module 40, the data detected by the sensor module 20, and the desired posture into a control strategy module 50. The dynamic parameters may include the centroid parameters, the inertia parameters and the mass parameters.

Finally, the robot inputs a driving instruction output by the control strategy module 50 into the joint module 21 to control the robot to adjust data of the joint module 21, so that the posture of the robot reaches or approaches the desired posture, thereby improving the stability of the body.

It can be understood that the logical architecture of the robot control method illustrated in this embodiment does not constitute a specific limitation on the robot control method. In other embodiments, the logical architecture of the robot control method may include more or fewer modules than shown in the figure or combine some modules, or split some modules, or arrange different modules. The illustrated modules may be implemented in hardware, software, or a combination of software and hardware.

For example, when the robot uses the mechanical arm to grab an express package, the robot first inputs the first dynamic parameters and the data detected by the sensor module 20 into the dynamic model 10. The first dynamic parameters are dynamic parameters of the mechanical arm of the robot before grabbing the express package. Next, the robot inputs the reaction force output by the dynamic model 10, the data detected by the sensor module 20, and the desired posture into the online identification module 30. After the mechanical arm of the robot grabs the express package, the online identification module 30 can calculate the first deviation between the current posture and the desired posture of the robot, first update the centroid parameters through the least squares method, and then estimate the inertia parameters and mass parameters using the strong tracking extended Kalman filter method. Then, the robot inputs the centroid parameters, the inertia parameters and the mass parameters output by the online identification module 30 into the dynamic parameter module 40. Next, the robot inputs the dynamic parameters output by the dynamic parameter module 40, the data detected by the sensor module 20, and the desired posture into the control strategy module 50. Finally, the robot inputs the driving instruction output by the control strategy module 50 into the joint module 21, so that the joint module 21 drives the foot end of the robot to generate a reaction force between the foot end and a ground to control the posture of the robot to reach or approach the desired posture. By adaptively adjusting the dynamic parameters, the robot can generate the reaction force between the foot end of the robot and the ground to offset an impact of the mechanical arm of the robot on the gravity of the express package, thus preventing a downward movement of the mechanical arm and improving the stability of the robot.

Figure 2:
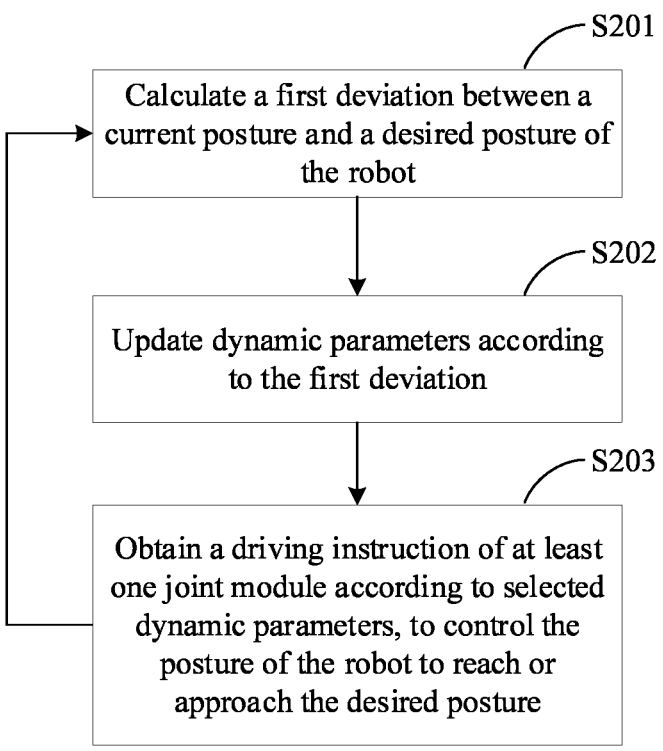
FIG. 2 is a flow chart of a robot control method provided by an embodiment of the present application.

Referring to FIG. 2, it illustrates a flow chart of a robot control method provided by an embodiment of the present application.

The robot control method may include the following blocks as shown in FIG. 2:

Block S201, the robot calculates the first deviation between the current posture and the desired posture of the robot.

It can be understood that the robot may include one or more joint modules. The robot can detect a force feedback signal of each of the one or more joint modules through a sensor, thereby determining whether the robot is subject to an external force or whether a load of the robot is increased or decreased based on the force feedback signal of each joint module, thereby determining whether the current posture of the robot deviates from the desired posture. When the robot is subjected to the external force, or when the robot increases or decreases its load, the posture of the robot changes.

In this embodiment, the robot can calculate the first deviation between the current posture and the desired posture of the robot based on the reaction force output by the dynamic model and the data detected by the sensor.

Block S202, the robot updates the dynamic parameters of the robot according to the first deviation.

Among them, the dynamic parameters may include the centroid parameters, the inertia parameters and the mass parameters.

In this embodiment, the dynamic parameters may include first dynamic parameters or second dynamic parameters. The first dynamic parameters refer to pre update dynamic parameters, and the second dynamic parameters refer to updated dynamic parameters.

The robot updates the dynamic parameters every control cycle or every one or more control cycles. Updating the dynamic parameters may include directly replacing the first dynamic parameters with the second dynamic parameters, or after the second dynamic parameters are obtained, the first dynamic parameters or the second dynamic parameters can be selected to use.

It can be understood that the control cycle can be set as needed. The robot may execute the robot control method of this embodiment once in each control cycle.

In some embodiments, the robot can first update the centroid parameters through the least squares method, and then estimate the inertia parameters and mass parameters through the strong tracking extended Kalman filter method, which can eliminate measurement noise and process noise when the posture of the robot changes, and improve an estimation speed and an accuracy of the estimation result.

In other embodiments, the robot may first update the centroid parameters through the least squares method, and then estimate the inertia parameters and mass parameters through the Kalman filter method or the extended Kalman filter method.

Block S203, the robot obtains a driving instruction of at least one joint module according to selected dynamic parameters, to control the posture of the robot to reach or approach the desired posture.

It can be understood that the robot may include one or more joint modules, and the one or more joint modules are used to drive the robot.

In this embodiment, after the dynamic parameters are updated, the robot can generate a driving instruction for at least one joint module according to the selected dynamic parameters. The driving instruction is used to drive the joint module to drive the foot end of the robot to generate a reaction force between the foot end and the ground to control the posture of the robot to reach or approach the desired posture.

It can be understood that there is a lag in a feedback control of this application, because controlling the robot to reach the desired posture is not achieved in one step. It does not mean that the current posture will be very close to the desired posture in the next control cycle. The entire process may require a plurality of control cycles to gradually "approach" the desired posture. Therefore, there may exist a certain time lag in reaching the desired posture.

Moreover, in most cases in practice, the desired posture is always changing. Due to the lag in feedback control, the actual posture is generally close to the desired posture, but may not completely reach the desired posture. As for a degree of closeness, it is mainly determined by an accuracy of the dynamics parameters and controller performance. In this application, reaching or approaching the desired posture is a process of dynamic change. "Approaching" means that during the feedback control process, the change trend of the current posture gradually approaches the desired posture.

The "select" includes two situations:

1. "Select" is not a step in implementing the robot control method of this embodiment. In some embodiments, when the robot uses the second dynamic parameters to directly replace the first dynamic parameters, the selected dynamic parameter is the second dynamic parameters. In this case, "select" can be understood as a setting, rather than as a step to implement the robot control method of this embodiment.

2. "Select" is a step in implementing the robot control method of this embodiment. In other embodiments, after the second dynamic parameters are obtained, the robot can choose to use the first dynamic parameters or the second dynamic parameters. The selected dynamic parameters may include the first dynamic parameters or the second dynamic parameters. In this case, "select" is a step to implement the robot control method of this embodiment.

It can be understood that after the robot completes block S203, it can return to block S201 to continue calculating a posture deviation of the robot and realize continuous correction of the posture of the robot.

FIG. 3 illustrates a flow chart of sub-blocks of block S201 shown in FIG. 2 provided by an embodiment of the present application.

Referring to FIG. 3, calculating the first deviation between the current posture and the desired posture of the robot may include the following blocks:

Block S301, the robot obtains rotational position information of the output end of at least one of the one or more joint modules of the robot, the torque information of the at least one joint module, as well as an angular velocity value of the body and a first linear acceleration value of the body.

It can be understood that the joint module encoder and the inertial measurement unit are sensors with specific functions. The joint module encoder is used to measure rotational positions of the joint module. The inertial measurement unit is used to measure the angular velocity and acceleration of the body in a three-dimensional space.

Among them, the rotational position information of the output end of the at least one joint module refers to the rotational position information of the output end of the at least one joint module in the three-dimensional space measured by the joint module encoder. The torque information of the at least one joint module refers to a force of the at least one joint module when the at least one joint module rotates. The angular velocity value of the body and the first linear acceleration value of the body respectively refer to an angular velocity value of the body and a linear acceleration value of the robot in the three-dimensional space measured by the inertial measurement unit. The linear acceleration value refers to an acceleration value of the robot when the robot is moving.

In this embodiment, the robot can detect the rotational position information of the output end of the at least one joint module, the torque information of the at least one joint module, and the angular velocity value of the body and the first linear acceleration value of the body through the sensors.

Block S302, the robot obtains a support reaction force by inputting the first dynamic parameters, the rotational position information of the output end of the at least one joint module, the torque information of the at least one joint module, and the angular velocity value of the body and the first linear acceleration value of the body into the dynamic model.

In one embodiment, the first dynamic parameters can include, but are not limited to, a first mass parameter, a first inertia parameter and a first centroid parameter. The first dynamic parameters refer to the pre update dynamic parameters.

It can be understood that the first dynamic parameters can be initial values, which can be obtained through CAD software simulation, or the first dynamic parameters can be theoretical values or priori values obtained by theoretical calculation. Since the robot control method is continuously executed in a loop, current dynamic parameters may be replaced after a next control cycle, so the first dynamic parameters may also be updated values obtained by executing the robot control method of this embodiment.

In some embodiments, the robot can construct the dynamic model using a classical mechanical analysis method or a Lagrangian method based on energy analysis, and then input the first dynamic parameters, the rotational position information of the output end of the at least one joint module of the robot, the torque information of the at least one joint module, as well as the angular velocity value of the body and the first linear acceleration value of the body into the dynamic model to obtain the support reaction force.

It can be understood that the dynamic model can split the support reaction force received by the robot as a whole into a support reaction force received by each of the at least one joint module, to calculate the support reaction force of each joint module.

Block S303, the robot calculates the first deviation between the current posture and the desired posture of the robot based on the support reaction force, the first centroid parameter, and the first mass parameter.

For example, when the robot increases the load and causes the current posture to deviate from the desired posture, the robot can calculate the posture through formula (1).

$$
\begin{cases}
L = F - u \\
F = -\left(\sum_{i=1}^{n} [f_i] \times\right) c \\
u = \sum_{i=1}^{n} \left( \frac{m_{base} c - m_{load} c_{load}}{m_{base} + m_{load}} \times f_i \right)
\end{cases}
\tag{1}
$$

Among them, L represents the posture of the robot, i represents a number of foot ends of the robot (for example, the number of foot ends of a quadruped robot is 4), $f_i$ represents the support reaction force received by the $i_{th}$ foot end, and $[f_i]x$ represents a skew symmetry matrix of the support reaction force received by the $i_{th}$ foot end, c represents a position coordinate of a centroid of the robot, $c_{load}$ represents a position coordinate of a centroid of a load, $m_{base}$ represents a mass of the robot, $m_{load}$ represents a mass of the load, n represents a total number of foot ends of the robot, F and u represent custom process parameters, which has no actual physical meaning.

It can be understood that the first centroid parameter is the position coordinate of the centroid of the robot. The first mass parameter is the mass of the robot. The centroid parameter is the position coordinate of the centroid of the load. The mass parameter of the load is the mass of the load.

The robot can calculate the position coordinate of the centroid of the load by calculating a deviation between the position coordinate of the centroid of the robot after adding the load and the position coordinate of the centroid of the robot before adding the load. The robot can calculate the mass of the load by calculating a deviation between the mass of the robot after adding the load and the mass of the robot before adding the load.

When the robot has no load, the centroid parameter of the load and the mass parameter of the load are both equal to 0.

In this embodiment, the robot calculates the current posture through formula (1), and then calculates a difference between the current posture and the desired posture, thereby obtaining the first deviation. The desired posture may be a theoretical value or a priori value obtained through theoretical calculation.

FIG. 4 is a flow chart of a robot control method provided by another embodiment of the present application.

Referring to FIG. 4, the robot control method may include the following blocks:

Block S401, the robot calculates the first deviation between the current posture and the desired posture of the robot.

It should be noted that the implementation of block S401 can be the same as block S201 shown in FIG. 2, and will not be described again here.

Block S402, the robot obtains the second dynamic parameters according to the first deviation.

In one embodiment, the second dynamic parameters can include, but are not limited to, a second centroid parameter, a second inertia parameter and a second mass parameter.

It can be understood that the method of obtaining the second dynamic parameters at block S402 is the same as the method of obtaining the dynamic parameters at block S202 shown in FIG. 2, and will not be described again here.

Block S403, the robot obtains a driving instruction of at least one joint module of the robot based on the second dynamic parameters, the desired posture, the rotational position information of the output end of the at least one joint module, the torque information of the at least one joint module, and the angular velocity value of the body and the first linear acceleration value of the body, so as to control the posture of the robot to reach or approach the desired posture.

In this embodiment, the robot generates the driving instruction for at least one joint module by combining the second dynamic parameters, the desired posture, and the joint module encoder of the robot, the joint module, and feedback information of the body. The drive instruction is used to drive the joint module to drive the foot end of the robot to generate a reaction force between the foot end and the ground, so as to control the robot to adjust a torque of a position of the centroid, so that the posture of the robot reaches or approaches the desired posture, thereby roughly offsetting torque changes in one or more direction of the position of the centroid, and improves the stability of the robot.

Specifically, the robot can calculate the linear acceleration and the angular velocity of movement of the body through formula (2), and then calculate the torque and the rotation speed of each joint module based on the linear acceleration and the angular velocity of movement of the body. When the joint module obtains the torque and speed information is received, the drive instruction of the joint module is triggered, thereby driving the joint module to drive a support structure of the robot to generate a reaction force between the support structure and the ground, to control the robot to adjust the torque of the position of the centroid, so that the posture of the robot reaches or is close to the desired posture.

$$
\begin{cases}
\dot{p} = \frac{\Sigma f}{m} - g \\
\frac{d(Iw)}{dt} = \Sigma(c - pfoot) \times f
\end{cases}
\tag{2}
$$

Among them, $\dot{p}$ represents the linear acceleration of movement of the robot, f represents the support reaction force on one foot end of the robot (for example, one of the feed of a quadruped robot), and $\Sigma f$ represents a total reaction force of reaction forces on all foot ends of the robot (for example, the four foot ends of the quadruped robot), m represents a total mass of the robot, g represents the acceleration of gravity, w represents the angular velocity of rotation of the robot, c represents the position coordinate of the centroid of the robot, pfoot represents the position coordinate of one foot end of the robot, I represents a total inertia of the robot, and t represents a time variable.

It can be understood that after the robot completes block S403, it can return to block S401 to continue calculating the deviation of posture of the robot and realize continuous correction of the posture.

Figure 5:
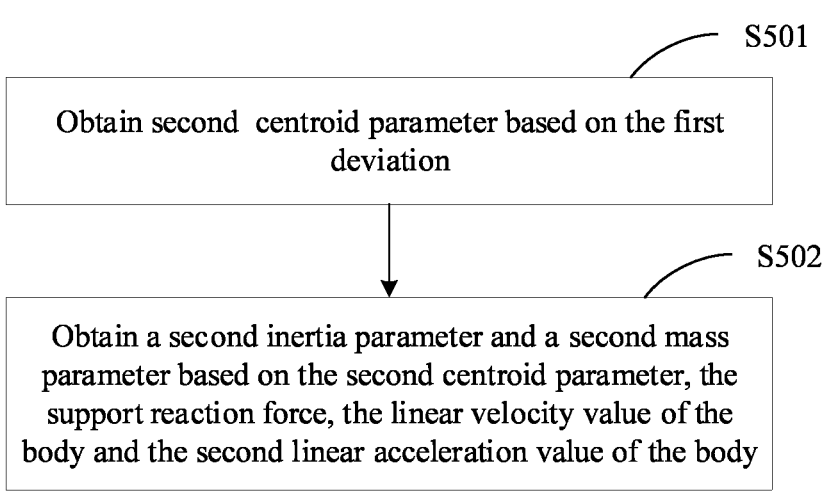
FIG. 5 is a flow chart of sub-blocks of block S402 shown in FIG. 4 provided by an embodiment of the present application.

FIG. 5 is a flow chart of sub-blocks of block S402 shown in FIG. 4 provided by an embodiment of the present application.

Referring to FIG. 5, obtaining the second dynamic parameters based on the first deviation may include the following blocks:

S501, the robot obtains a second centroid parameter based on the first deviation.

In some embodiments, the robot may estimate the second centroid parameter by iterating the angular momentum deviation to calculate the least squares solution.

Specifically, the robot can derive formula (3) by adding a constraint L=0 in formula (1), and then calculate the second centroid parameter through formula (3).

$$c(k+1) = c(k) + \alpha(-F_\times^+ u - c(k)) \tag{3}$$

Among them, $c(k)$ represents a position coordinate of the centroid of the robot at a $k_{th}$ moment, $c(k+1)$ represents a position coordinate of the centroid of the robot at a $k+1_{th}$ moment, $\alpha$ represents an iteration coefficient, $$F_\times^+$$

represents calculating a skew symmetry matrix of F first and then calculating a pseudo-inverse matrix, F and u are custom process parameters, without actual physics significance.

It can be understood that the iteration coefficient $\alpha \geq 0$. The first centroid parameter of the robot is the position coordinate of the centroid of the robot at the $k_{th}$ moment. The second centroid parameter of the robot is the position coordinate of the centroid of the robot at the $k+1_{th}$ moment.

Block S502, the robot obtains a second inertia parameter and a second mass parameter based on the second centroid parameter, the support reaction force, the linear velocity value and the second linear acceleration value of the body.

In some embodiments, the robot may estimate the second inertia parameter and the second mass parameter through a strong tracking extended Kalman filter method.

It can be understood that the feedback information obtained by the robot from the joint module encoder, the joint module and the inertial measurement unit may contain measurement noise, and there may also be process noise in a process of calculating the posture of the robot and calculating the second dynamic parameters. The robot can estimate the second inertia parameter and the second mass parameter through the Kalman filter method to eliminate measurement noise and process noise. When the dynamic model is a nonlinear model, the robot can estimate the second inertia parameter and the second mass parameter through the extended Kalman filter method, which can improve the accuracy of the estimation result on the basis of eliminating measurement noise and process noise. When the robot is frequently subjected to external forces, or the load is increased or decreased, causing the posture of the robot to change frequently, it is necessary to quickly estimate the second inertia parameter and the second mass parameter. The robot can estimate the second inertia parameter and the second mass parameter through the strong tracking extended Kalman filter method. The robot can improve the estimation speed and the accuracy of the estimation result on the basis of eliminating measurement noise and process noise.

Specifically, the robot can calculate the second inertia parameter and the second mass parameter through formula (4).

$$\begin{cases} \ddot{p} = \dfrac{\Sigma f}{m} - g \\ \dfrac{d(Iw)}{dt} = \Sigma(c - pfoot) \times f \\ \dot{m} = 0 \\ \dot{I} = 0 \end{cases} \tag{4}$$

Among them, p represents a distance that the robot moves, $\ddot{p}$ represents a second derivative of p, $\ddot{p}$ represents the linear acceleration of movement of the robot, f represents a reaction force received by one foot end of the robot (for example, one of the foot ends of a quadruped robot), $\Sigma f$ represents a total reaction force received by all the foot ends of the robot (For example, the four foot ends of a quadruped robot). m represents the total mass of the robot, $\dot{m}$ represents a first derivative of m, g represents the gravity acceleration, I represents a total inertia of the robot, $\dot{I}$ represents a first derivative of I, w represents the angular velocity of rotation of the robot, c represents the position coordinate of the centroid of the robot, pfoot represents the position coordinate of one foot end of the robot, and t represents a time variable.

It can be understood that no matter how the robot moves, the total mass and total inertia of the robot remain unchanged, that is $\dot{m}=0$, $\dot{I}=0$. The second centroid parameter of the robot is the position coordinate of the centroid of the robot. The linear velocity value and the second linear acceleration value of the robot are respectively the linear velocity value and the linear acceleration value of the robot when the robot moves.

Figure 6:
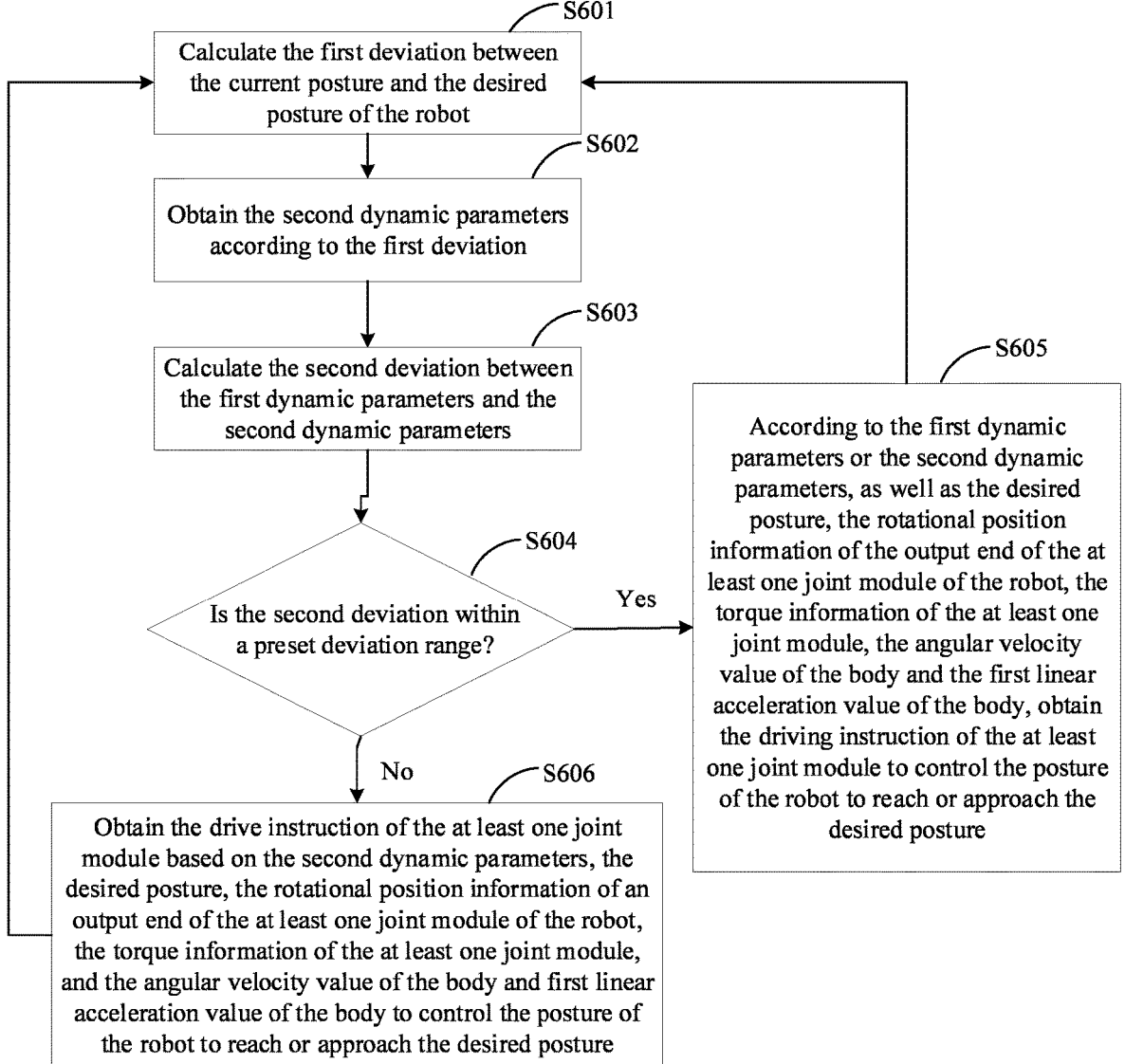
FIG. 6 is a flow chart of a robot control method provided by another embodiment of the present application.

FIG. 6 is a flow chart of a robot control method provided by another embodiment of the present application.

A difference between the robot control method provided by this embodiment shown in FIG. 6 and the embodiment shown in FIG. 4 is that based on the embodiment shown in FIG. 4, this embodiment determines whether the second deviation between the first dynamic parameters and the second dynamic parameters are within a preset deviation range, thereby determining a control strategy.

FIG. 6, the robot control method may include the following blocks:

Block S601, the robot calculates the first deviation between the current posture and the desired posture of the robot.

Block S602, the robot obtains the second dynamic parameters according to the first deviation.

The implementation of blocks S601 to S602 shown in FIG. 6 is the same as the implementation of blocks S401 to S402 shown in FIG. 4 and will not be described again here.

Block S603, the robot calculates the second deviation between the first dynamic parameters and the second dynamic parameters.

In one embodiment, the second deviation is a difference between the second dynamic parameters and the first dynamic parameters. The second deviation may be caused by changes in the position of the robot's centroid or the process noise and measurement noise in the calculation of dynamic parameters.

It can be understood that the second deviation includes at least one of the following: a mass parameter deviation, an inertia parameter deviation, and a centroid parameter deviation. The mass parameter deviation is a difference between the second mass parameter and the first mass parameter. The inertia parameter deviation is a difference between the second inertia parameter and the first inertia parameter. The centroid parameter deviation is a difference between the second centroid parameter and the first centroid parameter.

Block S604, the robot determines whether the second deviation is within a preset deviation range.

Among them, the preset deviation range can be set as needed.

It can be understood that the preset deviation range includes at least one of the following: a preset mass parameter deviation range, a preset inertia parameter deviation range, and a preset centroid parameter deviation range. When the second deviation includes the mass parameter deviation, the preset deviation range includes a corresponding preset mass parameter deviation range. When the second deviation includes the inertia parameter deviation, the preset deviation range includes a corresponding preset inertia parameter deviation range. When the second deviation includes the centroid parameter deviation, the preset deviation range includes a corresponding preset centroid parameter deviation range.

If the second deviation is within the corresponding preset deviation range, block S605 is executed; if the second deviation is not within the corresponding preset deviation range, block S606 is executed.

Block S605, according to the first dynamic parameters or the second dynamic parameters, as well as the desired posture, the rotational position information of the output end of the at least one joint module of the robot, the torque information of the at least one joint module, the angular velocity value of the body and the first linear acceleration value of the body, the robot obtains the driving instruction of the at least one joint module to control the posture of the robot to reach or approach the desired posture.

The implementation of block S605 is substantially the same as block S403 shown in FIG. 4, and will not be described again here.

Block S606, the robot obtains the drive instruction of the at least one joint module based on the second dynamic parameters, the desired posture, the rotational position information of the output end of the at least one joint module of the robot, the torque information of the at least one joint module, and the angular velocity value of the body and first linear acceleration value of the body to control the posture of the robot to reach or approach the desired posture.

The implementation of block S606 is the same as block S403 shown in FIG. 4, and will not be described again here.

After the robot completes block S605 or block S606, it can return to block S601 to continue calculating the posture of the robot and realize continuous correction of the posture.

For example, when the robot uses the mechanical arm to grab an express package, after the mechanical arm grabs the express package, the robot can calculate the first deviation between the current posture and the desired posture of the robot. The robot can first update the centroid parameter through the least squares method, and then estimate the inertia parameters and the mass parameters through the strong tracking extended Kalman filter method. Then, the robot calculates the second deviation between the pre update dynamic parameters and the updated dynamic parameters, and can calculate the centroid parameter deviation, the inertia parameter deviation and the mass parameter deviation respectively. When the second deviation is not within the preset deviation range, the robot determines that the express package may be heavier, causing the entire posture of the robot to deviate from the expectation. The robot generates the drive instruction for the at least one joint module based on updated dynamic parameters, the desired posture, and the data detected by the sensor, causes the at least one joint module to drive the foot end of the robot to generate a large reaction force between the foot end and the ground to control the posture of the robot to reach or approach the desired posture, and offset the impact of the mechanical arm from the gravity of the express package, and thereby prevent the mechanical arm from being affected by the gravity of the express package, and prevent the downward movement of the robotic arm so as to improve the stability of the robot. When the second deviation is within the preset deviation range, the robot determines that the express package may be relatively light, so that the current posture of the robot is not much different from the desired posture. The robot can select pre update dynamic parameters or the updated dynamic parameters. Then combined with the desired posture and the data detected by the sensor, the driving instruction of the at least one joint module is generated, so that the at least one joint module drives the foot end of the robot to generate a small reaction force between the foot end and the ground to control the posture of the robot to reach or approach the desired posture. Thereby improving the stability of the robot. In one embodiment, the large reaction force can be defined to be a reaction force that is greater than a preset value, and the small reaction force can be defined to be a reaction force that is smaller than a preset value.

The robot and a control terminal are provided by this application and are described below.

Figure 7:
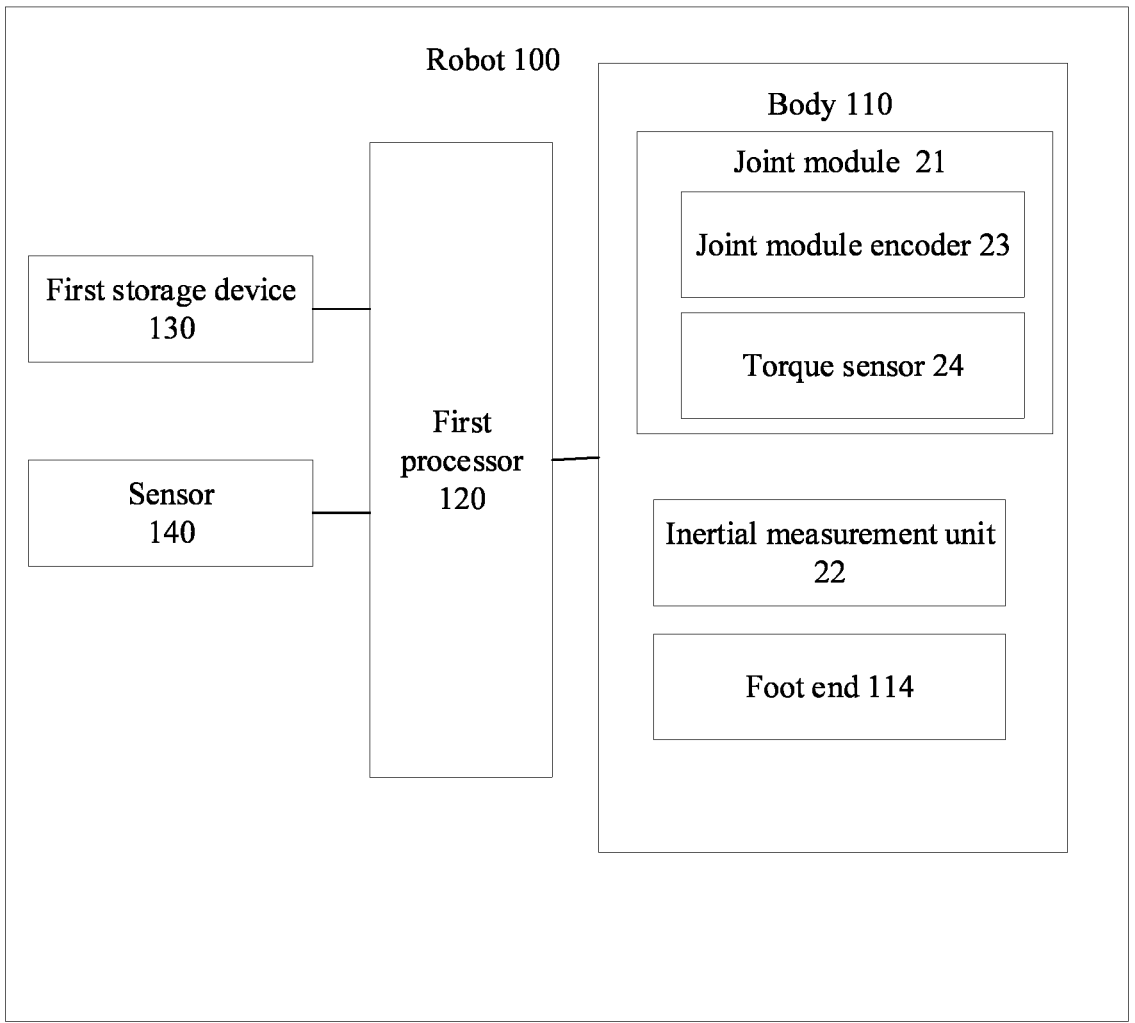
FIG. 7 is a schematic structural diagram of a robot provided by an embodiment of the present application.

FIG. 7 is a schematic structural diagram of a robot 100 provided by an embodiment of the present application.

Referring to FIG. 7, the robot 100 includes a body 110, a first processor 120, a first storage device 130, and a sensor 140. The body 110 may include a joint module encoder 111, a joint module 21, an inertial measurement unit 22 and one or more foot ends 114. The joint module 21 may include a joint module encoder 23 and a torque sensor 24. The joint module 21 can detect the torque information of the joint module 21 using the torque sensor 24, and detect the rotational position information of an output end of the joint module 21 through the joint module encoder 23. The sensor 140 can detect sensing data of the body 110, such as sensing data of the joint module encoder 111, the joint module 21, and the inertial measurement unit 22.

It can be understood that the first processor 120 can run a computer program or codes stored in the first storage device 130 to implement the robot control method in the embodiment of the present application.

The first processor 120 may include one or more processing units. For example, the first processor 120 may include, but is not limited to, an application processor (AP), a modem processor, a graphics processing unit, (GPU), an image signal processor (ISP), a controller, a video codec, a digital signal processor DSP), a baseband processor, a neural-network processing unit (NPU), etc. Among them, different processing units can be independent devices or integrated in one or more processors.

The first processor 120 may also be provided with a storage device for storing instructions and data. In some embodiments, the storage device in first processor 120 is a cache. The cache may store instructions or data that have just been used or recycled by the first processor 120. If the first processor 120 needs to use the instructions or data again, it can be directly called from the cache.

In some embodiments, the first processor 120 may include one or more interfaces. The one or more interfaces may include, but are not limited to, an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, etc.

It can be understood that the interface connection relationships between the modules illustrated in the embodiments of the present application are only schematic illustrations and do not constitute a structural limitation on the robot 100. In other embodiments, the robot 100 may also adopt different interface connection methods in the above embodiments, or a combination of multiple interface connection methods.

The first storage device 130 may include an external storage device interface and an internal storage device. Among them, the external storage device interface can be used to connect an external storage device card, such as a Micro SD card, to expand a storage capacity of the robot 100. The external storage device card communicates with the first processor 120 through the external storage device interface to implement the data storage function. Internal storage device may be used to store computer executable program code, which includes instructions. Internal storage device may include a program storage area and a data storage area. Among them, the stored program area can store an operating system, at least one application program required for a function (such as a sound playback function, an image playback function, etc.). The storage data area can store data created during use of the robot 100 (such as audio data, phone book, etc.). In addition, the internal storage device may include a high-speed random access memory, and may also include a non-volatile memory, such as at least one disk storage device, a flash memory device, or a universal flash storage (UFS). The first processor 120 executes various functional applications and data processing of the robot 100 by running instructions stored in the internal storage device and/or instructions stored in the first processor 120, for example, implementing the embodiments of the robot control method of the present application.

Figure 8:
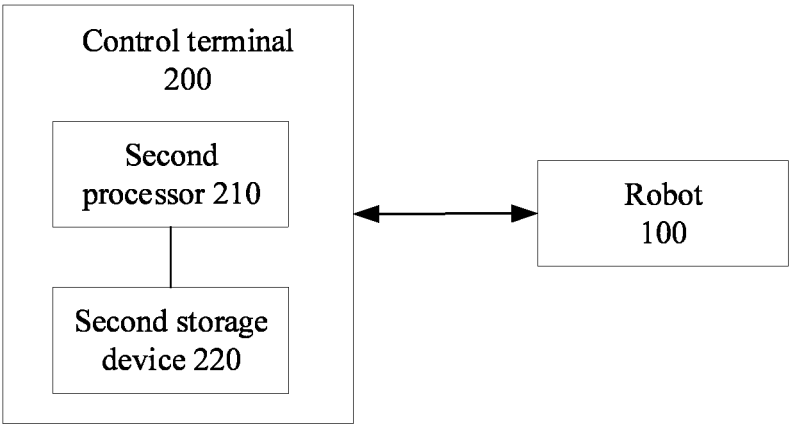
FIG. 8 is a schematic structural diagram of a control terminal provided by an embodiment of the present application.

FIG. 8 is a schematic structural diagram of a control terminal 200 provided by an embodiment of the present application.

The control terminal 200 can communicate with the robot 100 to control the robot 100. Referring to FIG. 8, the control terminal 200 includes a second processor 210 and a second storage device 220. The second processor 210 can run the computer program or code stored in the second storage device 220 to implement the robot control method in the embodiment of the present application.

It can be understood that the specific implementation of the second processor 210 and the second storage device 220 is substantially the same as the specific implementation of the first processor 120 and the first storage device 130 shown in FIG. 7, and will not be described again here.

It can be understood that the structure illustrated in the embodiment of the present application does not constitute a specific limitation on the robot 100 or the control terminal 200. In other embodiments, the robot 100 or the control terminal 200 may include more or less components than shown in the figures, or combine some components, or split some components, or arrange different components. The components illustrated may be implemented in hardware, software, or a combination of software and hardware.

The embodiments of the present application have been described in detail above in conjunction with the accompanying drawings. However, the present application is not limited to the above embodiments. Within the scope of knowledge possessed by those of ordinary skill in the art, various modifications can be made without departing from the purpose of the present application.

What is claimed is:

1. A robot control method, comprising:
   calculating a first deviation between a current posture and a desired posture of a robot;
   updating dynamic parameters of the robot according to the first deviation; and
   generating a driving instruction of at least one joint module of the robot according to selected dynamic parameters, and controlling a posture of the robot to reach or approach the desired posture according to the driving instruction;
   wherein calculating the first deviation between the current posture and the desired posture of the robot comprises:
   obtaining rotational position information of an output end of the at least one joint module of the robot, torque information of the at least one joint module, and an angular velocity value of a body of the robot and a first linear acceleration value of the body;
   obtaining a support reaction force by inputting first dynamic parameters, the rotational position information of the output end of the at least one joint module of the robot, the torque information of the at least one joint module, and the angular velocity value of the body and the first linear acceleration value of the body into a dynamic model, the first dynamic parameters comprise a first mass parameter, a first inertia parameter and a first centroid parameter;
   calculating the first deviation between the current posture and the desired posture of the robot according to the support reaction force, the first centroid parameter, and the first mass parameter.

2. The robot control method according to claim 1, wherein generating the driving instruction of at least one joint module of the robot according to selected dynamic parameters, and controlling the posture of the robot to reach or approach the desired posture according to the driving instruction, comprises:
   obtaining second dynamic parameters according to the first deviation, wherein the selected dynamic parameters are selected from the second dynamic parameters; and
   generating the driving instruction of at least one joint module of the robot according to the selected dynamic parameters, the desired posture, the rotational position information of the output end of the at least one joint module of the robot, the torque information of the at least one joint module, and the angular velocity value of the body and the first linear acceleration value of the body, and controlling the posture of the robot to reach or approach the desired posture according to the driving instruction.

3. The robot control method according to claim 1, wherein generating the driving instruction of at least one joint module of the robot according to selected dynamic parameters, and controlling the posture of the robot to reach or approach the desired posture according to the driving instruction, comprises:

obtaining second dynamic parameters according to the first deviation;

calculating a second deviation between the first dynamic parameters and the second dynamic parameters, wherein the first dynamic parameters are pre update dynamic parameters, and the second dynamic parameters are updated dynamic parameters; and determining whether the second deviation is within a preset deviation range;

in response that the second deviation is within the preset deviation range, generating the driving instruction of the at least one joint module according to the first dynamic parameters or the second dynamic parameters, the desired posture, and the rotational position information of the output end of the at least one joint module of the robot, the torque information of the at least one joint module, the angular velocity value of the body and the first linear acceleration value of the body, and controlling the posture of the robot to reach or approach the desired posture according to the driving instruction;

in response that the second deviation is not within the preset deviation range, generating the driving instruction of the at least one joint module according to the second dynamic parameters, the desired posture, the rotational position information of the output end of the at least one joint module of the robot, the torque information of the at least one joint module, and the angular velocity value of the body and the first linear acceleration value of the body, and controlling the posture of the robot to reach or approach the desired posture according to the driving instruction.

4. The robot control method according to claim 3, wherein updating dynamic parameters of the robot according to the first deviation comprises:

obtaining a second centroid parameter according to the first deviation;

obtaining a second inertia parameter and a second mass parameter according to the second centroid parameter, the support reaction force, the linear velocity value and the second linear acceleration value of the robot, wherein the second dynamic parameters comprise the second centroid parameter, the second inertia parameter and the second mass parameter.

5. The robot control method according to claim 3, wherein the second deviation comprises at least one of the following: a mass parameter deviation, an inertia parameter deviation, and a centroid parameter deviation, wherein the mass parameter deviation is a difference between the second mass parameter and the first mass parameter, the inertia parameter deviation is a difference between the second inertia parameter and the first inertia parameter, and the centroid parameter deviation is a difference between the second centroid parameter and the first centroid parameter.

6. A robot, comprising:

a body;

two or more legs coupled to the body;

at least one first processor in communication with the two or more legs;

a first storage device in communication with the at least one first processor, the first storage device storing instructions, that when executed by the at least one first processor, cause the at least one first processor to perform operations comprising:

calculating a first deviation between a current posture and a desired posture of the robot;

updating dynamic parameters of the robot according to the first deviation; and generating a driving instruction of at least one joint module of the robot according to selected dynamic parameters, and controlling a posture of the robot to reach or approach the desired posture according to the driving instruction;

wherein the at least one first processor calculates the first deviation between the current posture and the desired posture of the robot by:

obtaining rotational position information of an output end of the at least one joint module of the robot, torque information of the at least one joint module, and an angular velocity value of a body of the robot and a first linear acceleration value of the body using the sensor;

obtaining a support reaction force by inputting first dynamic parameters, the rotational position information of the output end of the at least one joint module of the robot, the torque information of the at least one joint module, and the angular velocity value of the body and the first linear acceleration value of the body into a dynamic model, the first dynamic parameters comprise a first mass parameter, a first inertia parameter and a first centroid parameter; and calculating the first deviation between the current posture and the desired posture of the robot according to the support reaction force, the first centroid parameter, and the first mass parameter.

7. The robot according to claim 6, wherein generating the driving instruction of at least one joint module of the robot according to selected dynamic parameters, and controlling the posture of the robot to reach or approach the desired posture according to the driving instruction comprises:

obtaining second dynamic parameters according to the first deviation, wherein the selected dynamic parameters are selected from the second dynamic parameters; and generating the driving instruction of at least one joint module of the robot according to the selected dynamic parameters, the desired posture, the rotational position information of the output end of the at least one joint module of the robot, the torque information of the at least one joint module, and the angular velocity value of the body and the first linear acceleration value of the body, and controlling the posture of the robot to reach or approach the desired posture according to the driving instruction.

8. The robot according to claim 6, wherein generating the driving instruction of at least one joint module of the robot according to selected dynamic parameters, and controlling the posture of the robot to reach or approach the desired posture according to the driving instruction comprises:

obtaining second dynamic parameters according to the first deviation;

calculating a second deviation between the first dynamic parameters and the second dynamic parameters, wherein the first dynamic parameters are pre update dynamic parameters, and the second dynamic parameters are updated dynamic parameters; and determining whether the second deviation is within a preset deviation range;

in response that the second deviation is within the preset deviation range, generating the driving instruction of the at least one joint module according to the first dynamic parameters or the second dynamic parameters, the desired posture, and the rotational position information of the output end of the at least one joint module of the robot, the torque information of the at least one joint module, the angular velocity value of the body and the first linear acceleration value of the body, and controlling the posture of the robot to reach or approach the desired posture according to the driving instruction;

in response that the second deviation is not within the preset deviation range, generating the driving instruction of the at least one joint module according to the second dynamic parameters, the desired posture, the rotational position information of the output end of the at least one joint module of the robot, the torque information of the at least one joint module, and the angular velocity value of the body and the first linear acceleration value of the body, and controlling the posture of the robot to reach or approach the desired posture according to the driving instruction.

9. The robot according to claim 8, wherein updating dynamic parameters of the robot according to the first deviation comprises:

obtaining a second centroid parameter according to the first deviation;

obtaining a second inertia parameter and a second mass parameter according to the second centroid parameter, the support reaction force, the linear velocity value and the second linear acceleration value of the robot, wherein the second dynamic parameters comprise the second centroid parameter, the second inertia parameter and the second mass parameter.

10. The robot according to claim 8, wherein the second deviation comprises at least one of the following: a mass parameter deviation, an inertia parameter deviation, and a centroid parameter deviation, wherein the mass parameter deviation is a difference between the second mass parameter and the first mass parameter, the inertia parameter deviation is a difference between the second inertia parameter and the first inertia parameter, and the centroid parameter deviation is a difference between the second centroid parameter and the first centroid parameter.

11. A control terminal in communication with a robot, comprising:

a second storage device;

at least one second processor in communication with the second storage device, the second storage device storing instructions, that when executed by the at least one second processor, cause the at least one second processor to perform operations comprising:

calculating a first deviation between a current posture and a desired posture of the robot;

updating dynamic parameters of the robot according to the first deviation; and generating a driving instruction of at least one joint module of the robot according to selected dynamic parameters, and controlling a posture of the robot to reach or approach the desired posture;

wherein calculating the first deviation between the current posture and the desired posture of the robot comprises:

obtaining rotational position information of an output end of the at least one joint module of the robot, torque information of the at least one joint module, and an angular velocity value of a body of the robot and a first linear acceleration value of the body using the sensor;

obtaining a support reaction force by inputting first dynamic parameters, the rotational position information of the output end of the at least one joint module of the robot, the torque information of the at least one joint module, and the angular velocity value of the body and the first linear acceleration value of the body into a dynamic model, the first dynamic parameters comprise a first mass parameter, a first inertia parameter and a first centroid parameter; and calculating the first deviation between the current posture and the desired posture of the robot according to the support reaction force, the first centroid parameter, and the first mass parameter.

12. The control terminal according to claim 11, wherein generating the driving instruction of at least one joint module of the robot according to selected dynamic parameters, and controlling the posture of the robot to reach or approach the desired posture comprising:

obtaining second dynamic parameters according to the first deviation, wherein the selected dynamic parameters are selected from the second dynamic parameters; and generating the driving instruction of at least one joint module of the robot according to the selected dynamic parameters, the desired posture, the rotational position information of the output end of the at least one joint module of the robot, the torque information of the at least one joint module, and the angular velocity value of the body and the first linear acceleration value of the body, and controlling the posture of the robot to reach or approach the desired posture according to the driving instruction.

13. The control terminal according to claim 11, wherein generating the driving instruction of at least one joint module of the robot according to selected dynamic parameters, and controlling the posture of the robot to reach or approach the desired posture comprising:

obtaining second dynamic parameters according to the first deviation;

calculating a second deviation between the first dynamic parameters and the second dynamic parameters, wherein the first dynamic parameters are pre update dynamic parameters, and the second dynamic parameters are updated dynamic parameters; and determining whether the second deviation is within a preset deviation range;

in response that the second deviation is within the preset deviation range, generating the driving instruction of the at least one joint module according to the first dynamic parameters or the second dynamic parameters, the desired posture, and the rotational position information of the output end of the at least one joint module of the robot, the torque information of the at least one joint module, the angular velocity value of the body and the first linear acceleration value of the body, and controlling the posture of the robot to reach or approach the desired posture according to the driving instruction;

in response that the second deviation is not within the preset deviation range, generating the driving instruction of the at least one joint module according to the second dynamic parameters, the desired posture, the rotational position information of the output end of the at least one joint module of the robot, the torque information of the at least one joint module, and the angular velocity value of the body and the first linear acceleration value of the body, and controlling the posture of the robot to reach or approach the desired posture according to the driving instruction.

14. The control terminal according to claim 13, wherein updating dynamic parameters of the robot according to the first deviation comprising:

obtaining a second centroid parameter according to the first deviation;

obtaining a second inertia parameter and a second mass parameter according to the second centroid parameter, the support reaction force, the linear velocity value and the second linear acceleration value of the robot, wherein the second dynamic parameters comprise the second centroid parameter, the second inertia parameter and the second mass parameter.

15. The control terminal according to claim 13, wherein the second deviation comprises at least one of the following: a mass parameter deviation, an inertia parameter deviation, and a centroid parameter deviation, wherein the mass parameter deviation is a difference between the second mass parameter and the first mass parameter, the inertia parameter deviation is a difference between the second inertia parameter and the first inertia parameter, and the centroid parameter deviation is a difference between the second centroid parameter and the first centroid parameter.

* * * * *